Feb. 14, 1956
P. K. BEEMER
2,734,957
DRIVE MECHANISM
Filed Jan. 19, 1952
5 Sheets-Sheet 1
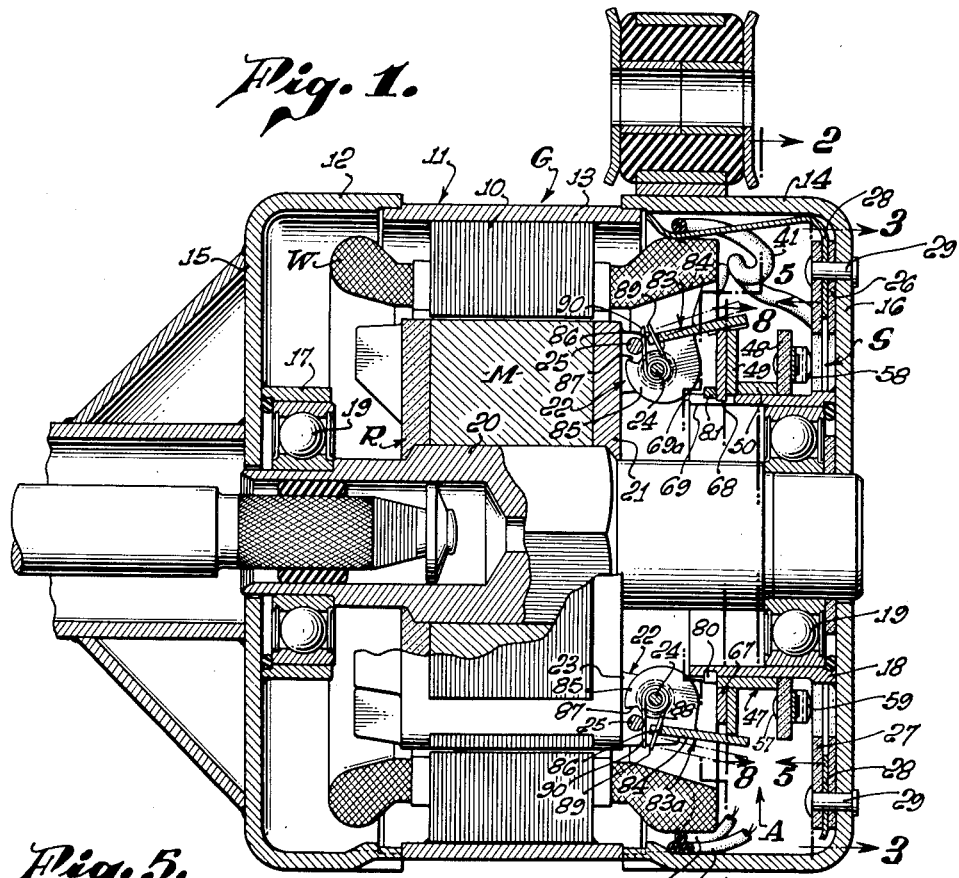
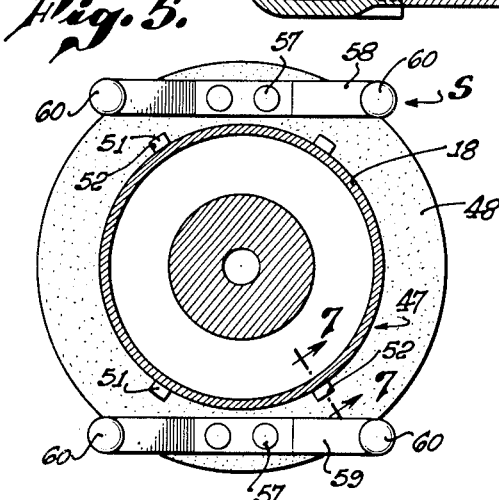
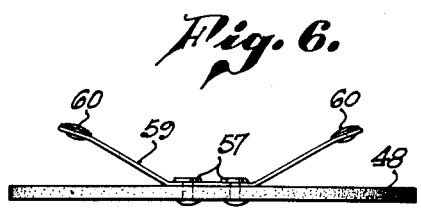
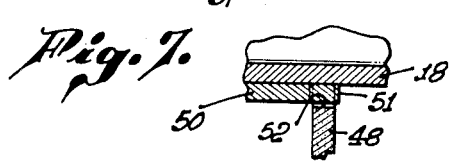
PAUL K. BEEMER,
INVENTOR.
BY
Bachelew & Scantlebury
ATTORNEYS.

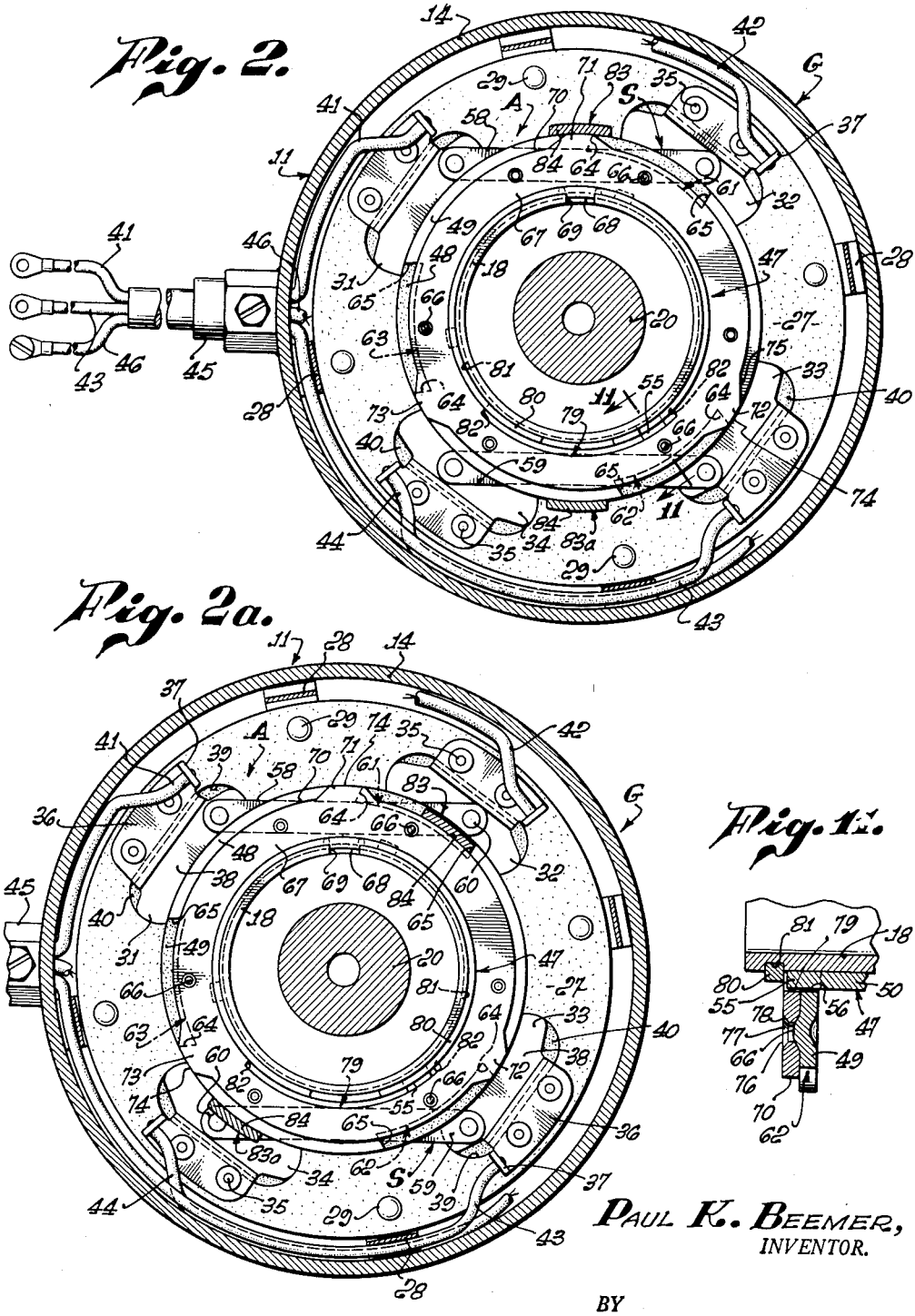

Feb. 14, 1956 P. K. BEEMER 2,734,957
DRIVE MECHANISM
Filed Jan. 19, 1952 5 Sheets-Sheet 3

PAUL K. BEEMER,
INVENTOR.

BY
Barkelew + Scantlebury
ATTORNEYS.

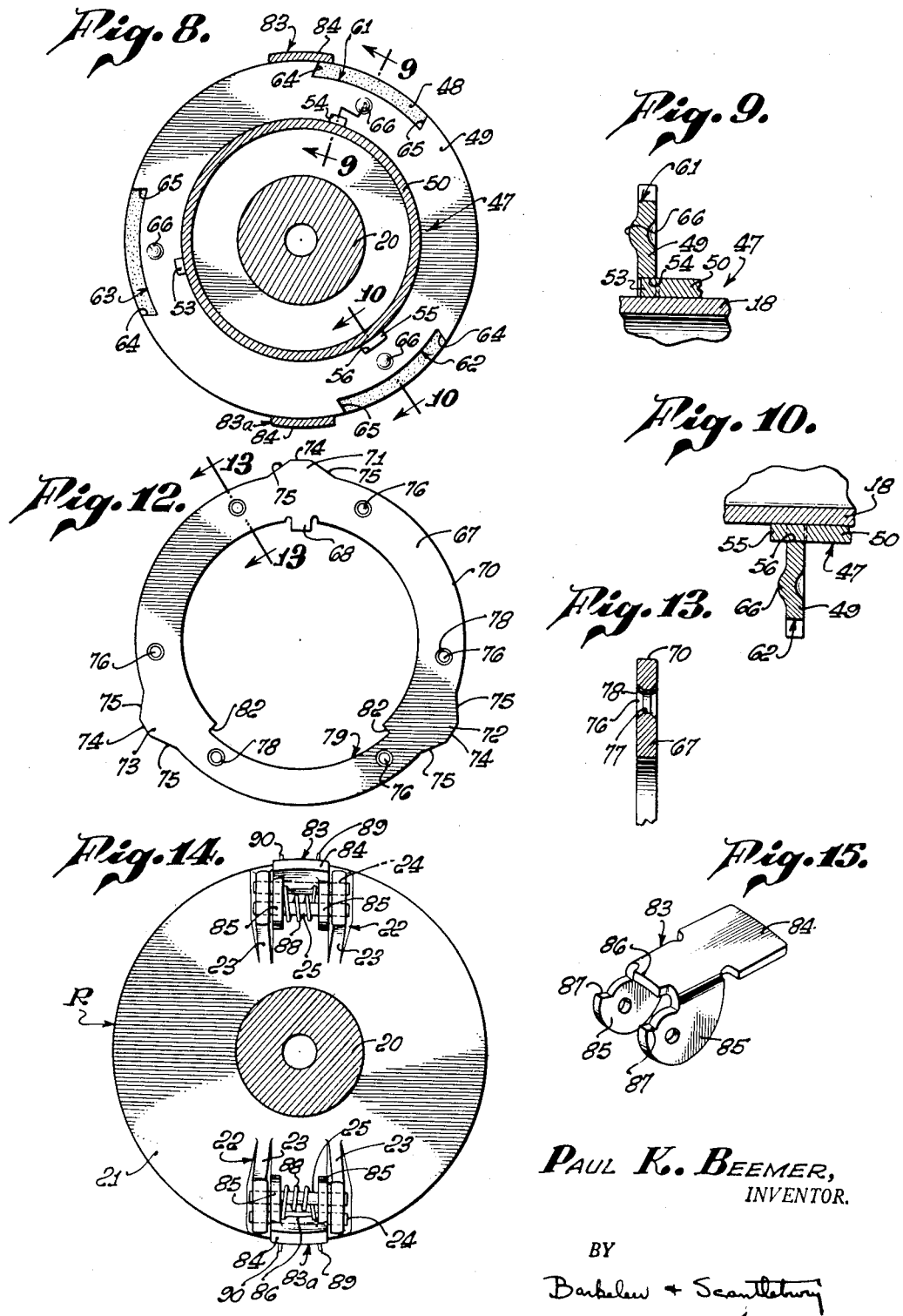

Feb. 14, 1956 P. K. BEEMER 2,734,957
DRIVE MECHANISM
Filed Jan. 19, 1952 5 Sheets-Sheet 5

PAUL K. BEEMER,
INVENTOR.

BY
Barkelew & Scantlebury
ATTORNEYS.

United States Patent Office 2,734,957
Patented Feb. 14, 1956

2,734,957
DRIVE MECHANISM

Paul Kaler Beemer, Pasadena, Calif., assignor to Preco Incorporated, Los Angeles, Calif., a corporation of California Application January 19, 1952, Serial No. 267,285

25 Claims. (Cl. 200—61.39)

This invention relates generally to drive mechanisms and is more particularly concerned with drives wherein the primary drive member is subject to reversals in its direction of rotation and wherein a controlling member is actuated during initiations of the reversals.

While the invention, considered in its broader aspects, is not so limited, it is particularly well adapted to combination with and actuation of electric switches, and it is one general object of the invention to provide a novel drive mechanism wherein a contact switch is in a given circuit-controlling condition when the primary drive member is rotating in a given direction, including means acting automatically and, preferably, immediately, upon reversal of the direction of rotation of the primary drive member to throw the switch to a second circuit-controlling condition; and means acting automatically and, preferably, immediately, to restore the switch to its first or "given" circuit-controlling condition upon subsequent restoration of the original direction of rotation of the drive member.

Though this is not at all limitative, the invention is particularly useful in connection with the maintenance of constant phase effect in the driven motor of a polyphase alternating current system, regardless of the direction of rotation of the prime mover of the generator; and, without intending thereby to limit the invention, I have illustrated and described it in such embodiment.

One of the particular utilities of such an arrangement is in connection with the powering of electrically driven accessories in railway cars. For instance, in refrigerator cars, the fans of air-circulatory systems are sometimes electrically driven, the driving current coming from a generator powered from the moving wheels of the car. It is among the objects of the invention to provide an improved system of this type.

An inherent difficulty arises from the fact that some types of fans must be driven in a single given direction of rotation if they are properly to function in the circulation system. On the other hand, the direction of travel of the equipped car, and hence the direction of rotation of its wheels, are often reversed, it resulting that the direction of rotation of the power take-off for the accessory drive is also reversed.

If the circulation fan is in a polyphase, alternating current system, and that system includes a generator whose rotor is driven from a car wheel, it will be seen that reversal of the direction of rotation of the car wheel and rotor, would result in the fan rotating first in one direction and then in the other, which, under the situation outlined above, is precluded.

Therefore it is one of the objects of the invention to provide a drive mechanism and controlled switch for such an electrical system, whereby, regardless of the direction of car wheel and generator-rotor rotation, the phase effect on the fan motor remains constant and, consequently, the fan constantly rotates in a given direction.

The nature of the invention is such that other features and advantages may be ascertained more readily from the detailed description which follows, but it is to be noted that among the general objects and features are those of providing a drive mechanism which is uncomplicated, is sure and rapid in operation, and is sufficiently rugged to withstand the extremely severe service conditions to which devices of this type are constantly exposed. Reference will be made to the accompanying drawings, in which:

Fig. 1 is a longitudinal medial section through a device embodying my invention, Fig. 2 is a transverse section on line 2—2 of Fig. 1;

Figs. 2a and 2b are views similar to Fig. 2, but showing certain of the parts in shifted positions;

Fig. 5 is a section on line 5—5 of Fig. 1, but showing none of the mechanism behind the plane of the disclosed ring member;

Fig. 6 is a bottom plan view of Fig. 5, but shows the springs in unrestrained condition;

Fig. 7 is an enlarged, fragmentary section on line 7—7 of Fig. 5;

Fig. 8 is a detail section on line 8—8 of Fig. 1;

Fig. 9 is an enlarged, fragmentary section on line 9—9 of Fig. 8;

Fig. 10 is an enlarged, fragmentary section on line 10—10 of Fig. 8;

Fig. 11 is an enlarged fragmentary section on line 11—11 of Fig. 2;

Fig. 12 is a detached elevation of the cam ring of the device;

Fig. 13 is an enlarged, fragmentary section on lines 13—13 of Fig. 12;

Fig. 14 is a detached, face view of the rotor shown in Fig. 1;

Fig. 15 is a detached perspective view of a switch-actuating pawl shown in Figs. 1 and 2.

Figure 2B:
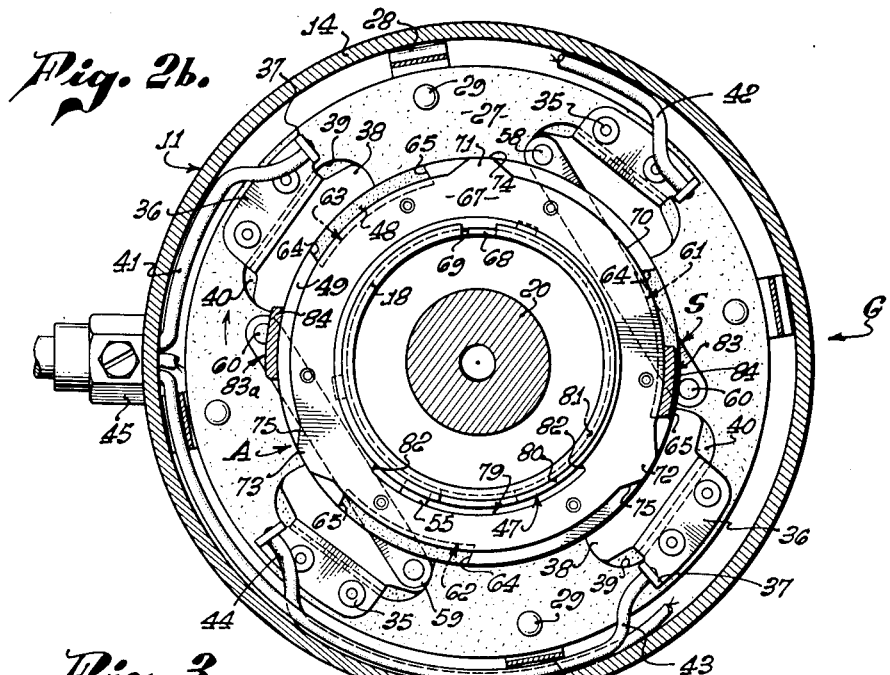

In the generalities given in the introduction, I have spoken of a primary drive member capable of rotation in either direction, and a switching arrangement which constantly maintains certain effects emanating from that drive member, in spite of reversals in the direction of rotation thereof. As here disclosed for illustrative purposes, the primary drive or operating member is the rotor shaft of a polyphase generator G, and the switch actuating mechanism generally indicated at A is adapted to actuate switch S to control the current put out by that generator. As a special, but not limitative, feature, I utilize the rotor R of the generator for carrying certain parts of the actuating mechanism, while the generator housing is employed both to house and support the switch and the remaining parts of the actuating mechanism.

Alternator G is a polyphase, permanent magnet type of generator whose rotor R and stator 10 are contained within a sectional housing 11 made up of three parts 12, 13 and 14 which are tied together in any suitable manner after the assembly of the generator and drive parts. Permanent magnets M are carried by the rotor, and stator 10 has usual windings, conventionally indicated at W. Housing parts 12 and 14 may be considered as "bells" whose cover-portions 15 and 16, respectively, ultimately form the end walls of housing 11. Axially alined hollow hubs 17 and 18 are secured, as by welding, to the inner faces of walls 15 and 16, respectively, and take within their bores the bearings 19 for rotor shaft 20. The bearings also function to hold the rotor shaft against endwise movement. The stator 10 is stationarily secured within housing ring 13 in any suitable manner.

The rotor R rotates within the bore of the annular stator 10 in the usual manner, and end plate 21 of the rotor supports diametrically opposed brackets 22, each of which is made up of two spaced arms 23 connected by pins 24 and 25 (Figs. 1 and 14). The purpose of these brackets and pins will appear later.

Figure 3:
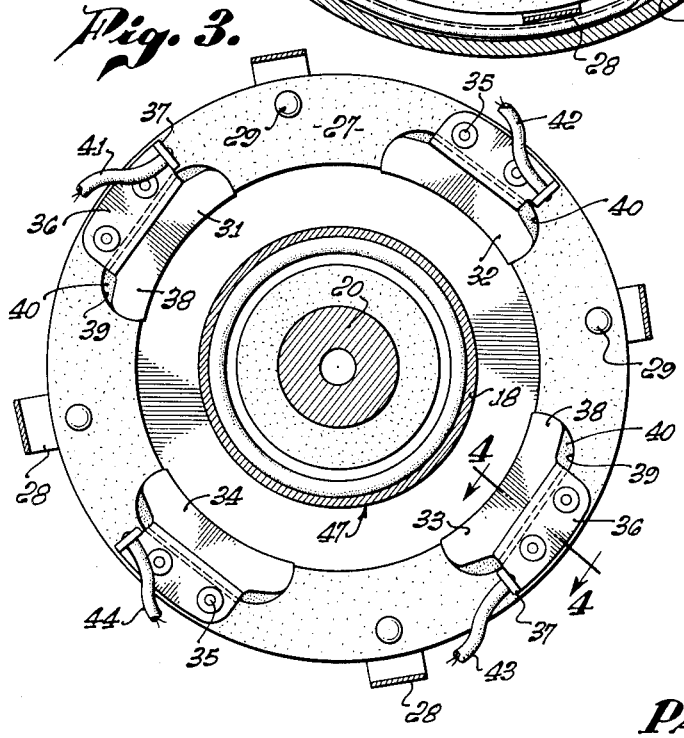
Fig. 3 is a section on line 3—3 of Fig. 1.
Figure 4:
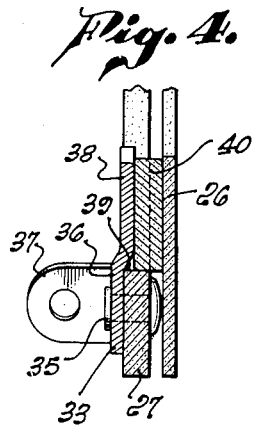
Fig. 4 is an enlarged, fragmentary section on line 4—4 of Fig. 3.

Switch S includes an insulating ring-washer 26 and a stationary contact-supporting ring 27 (Figs. 2, 3 and 4) which are slightly spread apart by spacer 28 and are riveted at 29 to end-wall 16 of housing section 14, the rings being concentric with rotor shaft 20 and hub 18. Ring 27 is made of insulating material such as cloth-base "Micarta," and four combination terminal plates and stationary contacts 31, 32, 33 and 34 are riveted at 35 to ring 27, the plates being spaced 90° apart.

All the plates being of the same construction, only one will be described. Each plate is made of hard copper, or the like, and includes a plate portion 36 from which a wire-attachment ear 37 angularly extends. It is portion 36 which is directly attached to ring 27, while the integral, contact or blade-portion 38, generally arcuate as viewed in plan, is depressed or offset into the opening 39 punched in ring 27, bringing the exposed face of the blade substantially flush with the exposed face of the ring (see particularly the sectional portion of Fig. 4). Preferably, though not necessarily, each blade portion 38 is backed up by a spacer 40 which is conveniently formed of the "punch-out" which resulted from punching the corresponding notch 39; the spacer engaging, at its side opposite blade 38, the outer face of ring-washer 26.

Attached to ears 37 of contacts 31, 32, 33 and 34, respectively, are wires 41, 42, 43 and 44. Line-wires 42 and 44 lead from stator winding W in the usual manner while wires 41 and 43 lead through housing-neck 45 to the exterior of the housing where they are adapted to be connected into the circuit (see Fig. 16, for instance) which it is the function of the generator to supply. The third line-wire 46 leads from winding W in the usual manner and passes to the housing exterior through neck 45.

While the invention broadly contemplates a drive-receiving element which is, in itself, a direct carrier for at least a part of the control mechanism, it is sometimes more convenient and efficient—as is true in the illustrated embodiment—to utilize separate drive-receiving and carrier elements. Thus, sub-assembly 47, which is mounted for limited oscillatory rotation on hub 18 of housing section 14, includes a contact carrying ring 48, whose contacts make up a part of switch S, a drive-receiving ring 49, and a connector collar 50. The parts of the sub-assembly are fabricated separately, but they are assembled in such manner that the parts are held against relative rotation, and thus act together as an oscillatory, driven unit.

For instance, collar 50 has end-tongues 51 (Figs. 5 and 7) which project into complementary notches 52 in ring 48, while tongues 53 Fig. 9 project from the opposite end of collar 50 into complementary notches 54 in drive-receiving ring 49. The collar 50 carries one extra wide and extra long tongue 55 which projects through complementary notch 56 in ring 49, and extends well beyond that ring, as indicated in Figs. 10 and 11, for a special additional purpose, to be described.

Contact-carrying ring 48 is made of insulating material, for instance such as that used for ring 27, and has riveted thereto at 57 (Figs. 5 and 6) two metallic contact members 58 and 59, which are in the form of spring-bridges having at their opposite ends the contact buttons 60. The spring-bridges are parallel and are arranged at diametrically opposite sides of ring 48, the bridges tending always to spring to the positions of Fig. 6. This figure illustrates the condition of the springs when they are unrestrained—for instance, before the installation of the sub-assembly 47, but it will be understood the springs are considerably flattened out and thus stressed when the switch is in fully assembled condition. I will later explain how contact ring 48 is held in operative association with contact ring 27.

Ring 49 (Figs. 2, 8, 9 and 10) which may be made of steel, has three equi-spaced, arcuate notches 61, 62 and 63 in its outer peripheral edge, the end-defining walls 64 and 65 of the notches preferably being somewhat undercut. Walls 64 and 65 represent oppositely facing drive-receiving shoulders, as will appear. Centered with each notch and pressed outwardly from the outer side face of ring 49, is a rounded detent-nubbin 66, of which I will speak later.

On hub 18, just to the left (Fig. 1) of ring 49, is a cam ring 67 (Figs. 12, 13) made, for instance, of steel having good wear-resistant qualities. The cam ring is removably mounted on hub 18, being held against rotation with respect thereto by means of an integral, radial key 68 entered in the open-ended keyway 69 (Fig. 1) provided in the hub. The outside diameter of the body-portion 70 of ring 67 is appreciably less than that of ring 49, but three integral and equi-spaced, radially extending cams 71, 72 and 73 have arcuate crown or dwell portions 74 which are substantially flush with the peripheral edge of ring 49. From crowns 74, the opposite sides 75 of the cams slope evenly and oppositely downward to the peripheral edge of body portion 70.

Detent sockets 76 are formed in both side faces of ring 67 by punching the ring, as at 77 (Fig. 13) and then counter-sinking the punch holes as at 78. Only the sockets at one side face of ring 67 are used in a given installation, but they are provided at both side faces so an assembler need not take the time nor trouble to pick out a particular side face which should go towards ring 49, for it is with the detent nubbins 66 on ring 49 that the detent sockets line up and with which they are selectively engaged during switch actuation, as will appear.

In assembling so much of the device as has thus far been described, assembly 47 is first slipped onto hub 18 of the detached housing section 14 and then followed up by cam ring 67, key 68 being entered in keyway slot 69 through its open end 69a (Fig. 1). Assembly 47 is rotated until tongue 55 registers with the elongated, arcuate notch 79 provided in the inner peripheral edge of cam ring 67 (Figs. 2 and 12), and the cam ring 67 is then thrust axially inward, moving assembly 47 ahead of it until contact buttons 60 properly engage contact ring 27 or the contact blades carried thereby, the spring-bridges 58, 59 being somewhat flattened out and stressed in the process. A snap ring 80 (Figs. 1 and 2) is then snapped into hub-groove 81 behind cam ring 67 to hold assembly 47 and ring 68 from moving to the left (Fig. 1) under the force of springs 58, 59. Spring bridges 58 and 59 are thus held in a stressed condition, insuring good contact with the stationary contact blades. At the same time, spring-bridges 58, 59 may yield to allow sub-assembly 47 to shift sufficiently to the right in Fig. 1 to allow detent nubbins 66 to cam out of detent sockets 76 when the drive-receiving ring 49 has predetermined rotative thrust applied to it, as will be described.

Now, it will be noted that, since cam ring 67 is keyed against rotation with respect to hub 18, the end-defining walls 82 of notch 79 in that ring, form positive stops which, in cooperation with tongue 55 on collar 50, limit the angular extent of oscillatory rotation of assembly 47 with respect to hub 18. Actually, the tongue 55 will not normally engage the stop shoulders 82 during operation of the switching device, for assembly 47 will normally be detent-held against rotation at the opposite ends of its oscillatory stroke, but the stop shoulders prevent harmful excess rotation of the assembly in the event the assembly tends to "over-run" beyond the detents. So long as the assembly 47 is held within the limit of movement allowed by the spacing of stop shoulders 82, it is assured that all the switch parts are in operative association.

Pivotally mounted on pins 24 of the diametrically opposite rotor-carried brackets 23, are drive or actuating pawls 83 and 83a (Figs. 1, 14 and 15). Each pawl has a driving arm 84, arcuate in transverse cross section, from the sides of which extend the spaced, arcuate, cheek-plates 85, the latter directly taking pin 24. Arm 84 has a tailpiece 86, while cheeks 85 are provided with shoulders 87 which extend radially with respect to pin 24. Mounted on pin 24 is a torsion spring 88 whose extended ends 89 and 90 engage pin 25 and the rear end of arm 84, respectively. The distal end of pawl-arm 84 is adapted, at times, to ride on the edge of ring 49, and, at times, successively on cams 71, 72 and 73. Spring 88 has a constant tendency to bring about such riding engagement. However, before the rotor and switch elements have been assembled, the engagement of shoulders 87 with pin 25 will limit the movement of the pawl in its spring-biased direction, and thus make assembly more easy by insuring that the pawl ends properly engage and slide transversely over the rings 49 and 67 as housing ring 13 and bell 14 are slipped together.

On the other hand, at times the pawls are moved out of the described riding engagement and against the resistance of springs 88. That is, the center of mass of each pawl is so located with respect to the point of its pivotal support that, when rotor R reaches a given speed, the pawls will swing, under the influence of centrifugal force, towards the dotted line positions of Fig. 1. But the ultimate engagement of tail pieces 86 with pins 25 will limit the extent of such swing in a manner to prevent interference with other parts.

For purposes of describing the operation of the device, it will be assumed that the parts are in the relative positions of Figs. 1 and 2. At this time, pawl 83 is riding on the crown of cam 71, while pawl 83a is riding on the periphery of ring 49. Spring-bridge 58 is maintaining contact between terminal members 32 and 31, so wires 42 and 41 are in electrical connection; and spring-bridge 59 is maintaining contact between terminal members 34 and 33, so wires 44 and 43 are in electrical connection.

Detents 66 on ring 49 will be engaged in registering sockets 76 in cam ring 67, the detents and sockets being so located with relation to the various elements that cams 71, 72 and 73 overlie shoulders 64 of notches 61, 62 and 63, respectively, in a manner to "disable" or "neutralize" said shoulders when the rotor is rotating in a counter-clockwise direction (Fig. 2) after an actuation of sub-assembly 47 by virtue of the initial counter-clockwise movement of the rotor, as will appear.

It will be assumed that rotor R is rotating in a counterclockwise direction (Fig. 2) sufficiently slowly that centrifugal force is ineffective to overpower pawl-springs 88. Each time an arm 84 of either of the pawls rides beyond a shoulder 65 (Figs. 2 and 8) of one of the notches 61, 62 or 63 in ring 49, it will be spring-pressed into that notch. However, just before arm 88 reaches the opposed shoulder 64, it will be forced outwardly again by the associated, inclined cam face 75 and then ride on the periphery of ring 49, and thus the pawl will have no operative effect on ring 49 or unit 47 so long as the rotor continues to rotate, or, after a full stop without reversal, starts to rotate in a counter-clockwise direction.

When the rotor speeds up sufficiently, centrifugal force swings the pawls clear of the cam ring 67 and drive ring 49, to avoid all running wear between the pawls and rings. Since the usual running speed of the rotor will be sufficient to bring this condition about, running wear is reduced to a minimum.

Now suppose the rotor stops and then starts to reverse its direction of rotation. The pawls 83, 83a at this time will, of course, be spring-held in the positions of Figs. 1 and 2. With the rotor now rotating in a clockwise direction (Fig. 2) the spring-urged pawl 83 rides down the right-side slope 75 of cam 71 and into notch 61. With the notches spaced 120° apart and the pawls spaced 180° apart, it requires but relatively little rotation of the rotor to enter one or the other of the pawls in one or another of the notches no matter where the reversing cycle starts, all to obvious advantage.

Pawl 83 travels through notch 61 and after engaging drive-receiving element or shoulder 65 (Fig. 2a) imparts for a time thereafter, its rotative force to ring 49 and hence to the entire sub-assembly 47, spring-bridges 58 and 59 yielding to allow sufficient bodily axial shift of the sub-assembly to permit the detent nubbins 66 to be cammed out of sockets 76.

The rotation of sub-assembly 47 rotates bridge-springs 58, 59 toward the position of Fig. 2b, the pawl 83 finally riding up the near sloping face 75 of cam 72, and thus, in effect, being pushed outwardly from notch 61. When the pawl reaches the crown 74 of cam 72 it will have been pushed radially clear of shoulder 65 and therefore the rotative drive to sub-assembly 47 ceases, detent nubbins 66 engaging the associated sockets 76 to check any overrunning tendency of the sub-assembly. The ring 48 will now be in such position that bridge-spring 58 maintains contact between terminal members 32 and 33, so wires 42 and 43 are in electrical connection, and spring 59 maintains contact between terminal members 34 and 31 so wires 44 and 41 are in electrical connection.

During continued clockwise rotation of rotor R, pawls 83 and 83a are disabled just as they were when the rotor was rotating counter-clockwise, that is, they either ride idly into and out of notches 61, 62 or 63, or they are held out of operative position by centrifugal force.

Now, if the rotor comes to a stop and then starts again to rotate in a counter-clockwise direction, one of the pawls 83 or 83a will ride down a cam face 75 and into a notch 61, 62 or 63 and finally engage the associated shoulder 64. Thereupon, continued counter-clockwise rotation of the rotor will impart, through said one pawl, its rotative counter-clockwise drive to sub-assembly 47, and restore all parts of actuating mechanism A and switch S to the conditions of Figs. 1 and 2, the previously engaged pawl finally riding up a cam face 75 onto a cam crown 74 and thus being knocked radially clear of shoulder 64. Thereafter, until there is a reversal of rotor R, counter-clockwise rotation of the rotor may continue or re-start without affecting the condition of mechanism A and switch S.

It has been pointed out that when the device is in the condition of Fig. 2, wires 44 and 43 are connected by bridge 59, while wires 42 and 41 are connected by bridge 58. If it be considered that the direction of rotation of rotor R is such that wires 44 and 42 are energized in the order named, it will be seen that wires 43 and 41 will also be energized in the order named. Now, if the rotor be reversed and switch S thus be shifted by mechanism A to a position wherein bridge 58 connects contacts 32, 33 and bridge 59 connects contacts 31, 34 (a position which corresponds generally to Fig. 2a, except that bridges 58, 59 will be moved a little further in a clockwise direction) the order of energization of wires 44, 42 may be considered as reversed to the order 42, 44, but the order of energization of wires 43, 41 will remain as it was. Thus, in spite of the reversal of the rotor, the phase effect in a motor energized by lines 43, 41, 46, will remain constant and, accordingly, said motor will constantly rotate in a single given direction.

Figure 16:
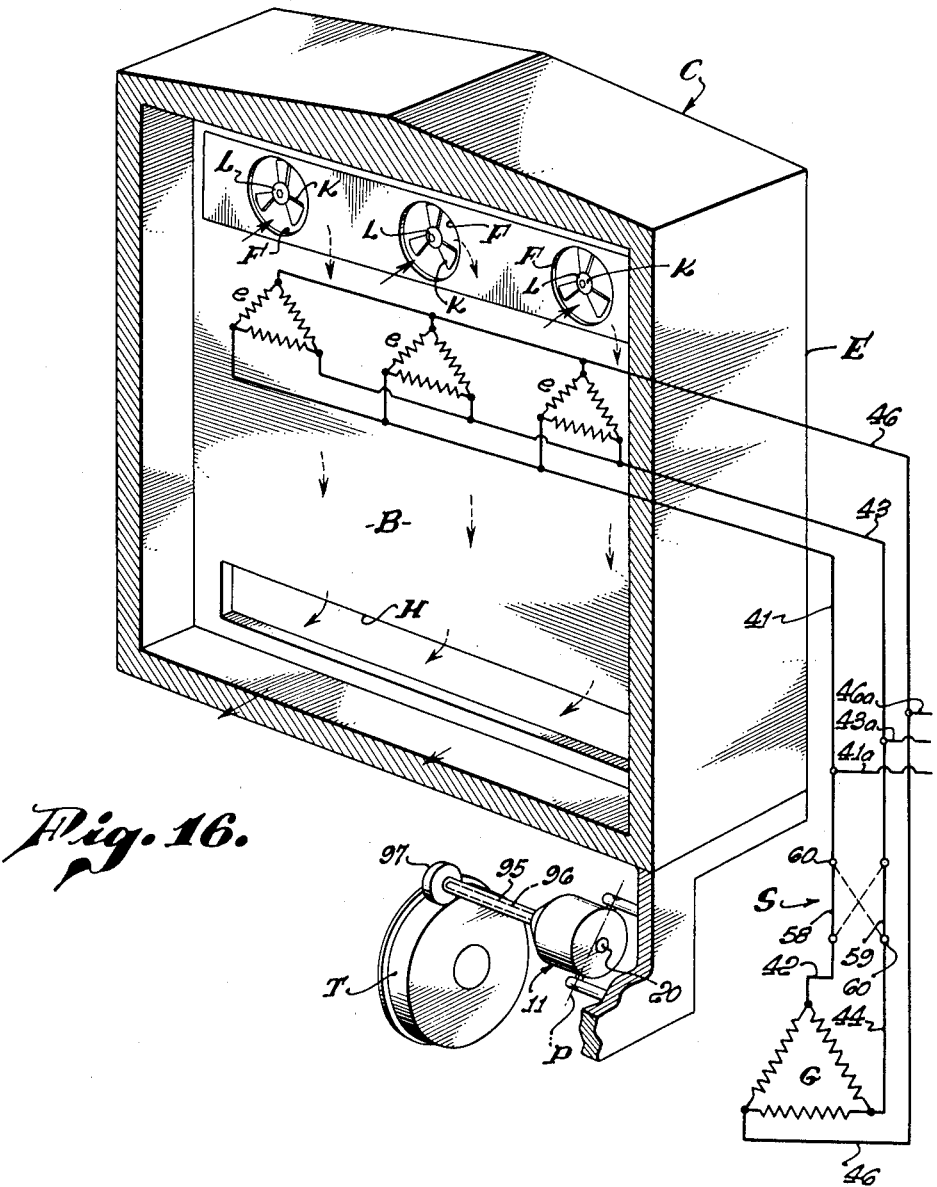
Fig. 16 is a schematic view showing the invention as applied to a railway refrigerator car.

Fig. 16 illustrates the embodiment of the invention in an air circulatory system for refrigerator railway cars. One end portion of a typical refrigerator car is shown at C, there being a bulkhead B which encloses an ice bunker D between it and the end wall E of the car. The bulkhead has openings F and H at top and bottom, and one or, preferably, several motor driven fans K are set in the upper opening. Synchronous motors for the several fans are indicated physically at L and diagrammatically at e.

It is desired, say, to drive the several fans K in such direction of rotation that air from the upper part of the car interior is circulated downwardly through bunker D and out through lower opening C. The installation shown in Fig. 16 is preferably duplicated at the opposite end of the car; so that the complete installation may typically include, say, six motor driven fans.

The polyphase generator, indicated diagrammatically at G, is contained, along with the switching mechanism A, S, in housing 11, as has been previously described. Housing 11 is extended as a long tube 95 and houses the shaft 96 by which the generator rotor is driven; the shaft, in turn, carrying driving roller 97. The unit made up of elements 11, 95, 96 and 97 is mounted on the car body for pivotal movement about axis P to and from a position engaging roller 97 with car wheel T; and, usually under pressure of a spring (not shown) to follow relative movements of the car wheel.

Switch S is illustrated diagrammatically in this figure, wires 41, 43 and 46 being extended to motors "e" or L of fans K, these wires being tapped by wires 41a, 43a and 46a, respectively, to service the corresponding fans (not shown) at the opposite end of the car.

It will be apparent that when roller 97 is engaged with car wheel T while the car is under way, generator G acts to energize the synchronous fans K and, because of switch S, to cause the fan blades to rotate in a given direction regardless of the direction of car-movement. The fan blades are, of course, pitched to circulate the air in the chosen direction when they are rotated in the said given direction.

It is to be noted that the system accomplishes drive between wheel T and fans K, with full self-accommodation to reversals of car-movement, in an extremely uncomplicated and sure manner. The number of wires in the electrical circuity is kept to a minimum, and all the difficulties of commutator construction and upkeep are avoided. No mechanical uncoupling and re-coupling of the drive shaft is involved in the preservation of uni-directional fan rotation when the direction of car-movement is reversed. The advantages of such features in refrigerator car equipment are self-evident.

While I have shown and described a preferred embodiment of my invention, various changes in design, structure and arrangement may be made without departing from the spirit and scope of the appended claims.

I claim:

1. A device of the character described, comprising a rotary, primary operating member which is adapted to be rotated intermittently in opposite directions, an actuating member carried by and bodily rotatable with said operating member and movable individually with respect thereto, a drive-receiving member mounted for oscillation about the axis of the operating member, a pair of angularly spaced and oppositely facing drive elements on said drive-receiving member, means yieldably moving said actuating member into the path of one of said elements when the operating member is initially rotated in a given direction and into the path of the other of said elements when the operating member is initially rotated in the opposite direction, whereby subsequent rotation of the operating member in a given direction rotates the drive-receiving member in a corresponding direction, and a stationary cam face engageable with said actuating member after the drive-receiving member has been thus rotated through a predetermined angular extent and thereby disengaging the actuating member from the previously engaged drive element.

2. A device as in claim 1; wherein said actuating member is a pawl connected to said operating member for pivotal movement about an axis which is transverse with respect to the axis of the operating member.

3. A device as in claim 1; wherein said actuating member is a pawl pivoted to said primary operating member and said yielding means is a spring urging said pawl in a radially inward direction with respect to said axis.

4. A device as in claim 3; wherein the center of mass of the pawl is offset from the pivotal mounting thereof in a manner whereby centrifugal force holds the pawl clear of said drive receiving member when the rotor is rotating at and above a given speed.

5. A device as in claim 4; including means limiting the extent of movement of the pawl under the influence of centrifugal force.

6. A device as in claim 1; wherein said cam face neutralizes said initially engaged drive element upon continued and re-initiated rotation of the operating member in said given direction until the operating member has had intermediate rotation in the opposite direction.

7. A device as in claim 1; wherein said drive elements are shoulders forming the end-defining walls of an arcuate notch provided in the periphery of the drive-receiving member.

8. A device as in claim 1; wherein said oppositely facing drive elements are provided in a plural number of equiangularly spaced sets on said drive-receiving member, and wherein there is an equal number of cam faces, similar to said cam face, and arranged in angularly spaced relation about the axis of rotation of the operating member, the angular spacing of the sets of elements and of the cam faces being equal.

9. A device as in claim 8; including a second actuating member similar to and located diametrically opposite the specified actuating member.

10. A device as in claim 1; wherein there is a plurality of actuating members carried, in angularly spaced relation, by said operating member, each of said actuating members being similar to the specified actuating member.

11. A device as in claim 1; wherein initial rotation of the operating member in the opposite direction acts, through the engagement of said actuating member with the other of said drive elements, to rotate the drive-receiving member in a corresponding direction, and a second stationary cam face engageable with said actuating member after the drive-receiving member has been thus rotated a predetermined angular extent and thereby disengaging the actuating member from said other drive element.

12. A device as in claim 11; wherein said second cam face neutralizes said other drive element upon continued and re-initiated rotation of the operating member in said opposite direction until the operating member has had intermediate rotation in said given direction.

13. A device as in claim 1; including also a stationary switch element, and a movable switch element cooperating with said stationary switch element, said movable switch element being operated by virtue of the specified movement of the drive-receiving member.

14. A device as in claim 11; including also a stationary switch element, and a movable switch element cooperating with said stationary switch element, said movable switch element being operated by virtue of oscillations of said drive-receiving elements as set up by sequential reversals in the direction of drive member rotation.

15. A device as in claim 1; wherein said drive-receiving member is a ring, the drive elements are the end-defining walls of an arcuate notch cut in the periphery of the ring, and the cam face is a radial extension provided on a second ring which is coaxial with the first mentioned ring, the unnotched portion of the first mentioned ring being substantially flush with the cam face at its point of greatest radial extension.

16. A device as in claim 15; including also cooperative stop means on the two rings and positively limiting the extent of angular movement of the drive-receiving member.

17. A device as in claim 15; wherein said two rings lie side by side and are limitedly relatively axially movable, said rings being provided with detent elements which are mutually engageable to yieldably hold the rings against relative rotation at the opposite ends of the oscillatory stroke of the drive receiving member, and a spring urging one of said rings axially toward the other ring to bring about such mutual engagement.

18. A device as in claim 15, including also detent means on the two rings and yieldably holding the rings against relative rotation at the opposite ends of the oscillatory stroke of the drive receiving member.

19. In combination, a rotary, primary operating member adapted to be rotated intermittently in opposite directions, an actuating member carried by and bodily rotatable with said operating member and movable individually with respect thereto, a plurality of angularly spaced, electric circuit contact members stationarily mounted about the axis of rotation of the operating member, a drive-receiving member mounted for rotary oscillation about said axis, electric circuit contact members oscillated by oscillations of the drive-receiving member for selective engagement with said first mentioned contact members, a drive taking element on said drive-receiving member, means yieldably urging said actuating member into the path of said drive taking element when the operating member is initially rotated in a given direction, whereby continued rotation of the operating member in said direction rotates said second mentioned contact members from one contacting condition with relation to the stationary contacts toward a second contacting condition, a stationary cam face engageable with said actuating member when the drive-receiving member has rotated the first mentioned contact members to said second contacting condition and, by virtue of such engagement, moving said actuating member out of driving engagement with said drive-taking element, the cam thereafter preventing said actuating member from re-engaging said drive-taking element as long as the operating member continues to rotate in said given direction or, after a stop, again starts to rotate in said given direction without an intermediate reversal of direction.

20. A device as in claim 19; including a spring for pressurally mutually contacting said first and second mentioned contacts when in said selective engagement, and wherein said drive-receiving member is a ring, the drive elements are the end-defining walls of an arcuate notch cut in the periphery of the ring, and the cam face is a radial extension provided on a second ring which is coaxial with the first mentioned ring, the unnotched portion of the first mentioned ring being substantially flush with the cam face at its point of greatest radial extension; wherein said two rings lie side by side and are limitedly relatively axially movable, said rings being provided with detent elements which are mutually engageable to yieldably hold the rings against relative rotation at the opposite ends of the oscillatory stroke of the drive receiving member, said spring urging one of said rings axially toward the other ring to bring about such mutual engagement.

21. A device as in claim 19; including a second drive-taking element on said drive-taking member and angularly spaced from said first mentioned element, said actuating member being yieldably urged into the path of said second drive-taking element when the operating member is initially rotated in the opposite direction, whereby continued rotation of the operating member in said opposite direction rotates said second mentioned contact members toward said one contacting condition, and a second stationary cam face engageable with said actuating member when the drive-receiving member has rotated the first mentioned contact members to said first contacting condition and, by virtue of such engagement, moving said actuating member out of driving engagement with said second drive-taking element, the cam thereafter preventing said actuating member from re-engaging said second drive-taking element as long as the operating member continues to rotate in said opposite direction or, after a stop, again starts to rotate in said opposite direction without an intermediate reversal of direction.

22. In a device of the character described, a rotary, primary operating member which is adapted to be rotated intermittently in opposite directions, a plurality of angularly spaced actuating members carried by and bodily rotatable with said operating member and movable individually with respect thereto, a drive receiving member mounted for oscillation about the axis of the operating member, a plurality of pairs of angularly spaced and oppositely facing drive elements on said drive-receiving member, there being one more pair of drive elements than there are actuating members, means yieldably moving one of said actuating members between the drive elements of one of said pairs when the operating member is initially rotated in a given direction whereby the actuating member engages one of the elements of that pair in a manner to rotate the drive receiving member in a corresponding direction, and means engageable with said actuating member after the drive-receiving member has been thus rotated through a predetermined angular extent and disengaging the actuating member from the previously engaged drive element.

23. A device as in claim 22; wherein the actuating members are pawls pivoted to the primary operating member, and said yielding means are springs urging said pawls in radially inward directions with respect to said axis.

24. A device as in claim 23, wherein each of said pairs of drive elements are shoulders forming the end-defining walls of an arcuate notch provided in the periphery of the drive-receiving member.

25. A device as in claim 22; wherein the last named means comprises a plurality of stationary cam faces of a number equal to the number of said pairs of drive elements and spaced apart by angles equal to those by which the pairs are spaced apart.

References Cited in the file of this patent

UNITED STATES PATENTS

| | | |
|---|---|---|
| 699,388 | Hutchins | May 6, 1902 |
| 706,082 | Moskowitz | Aug. 5, 1902 |
| 1,676,312 | Alexanderson | July 10, 1928 |
| 2,519,598 | Patten | Aug. 22, 1950 |